April 20, 1965   K. G. EDSMAR   3,179,147
TRACTION-AUGMENTING STUD FOR A VEHICLE TIRE
Filed March 2, 1964

INVENTOR
KURT GERHARD EDSMAR,
BY Pierce, Scheffler & Parker
his ATTORNEYS

United States Patent Office 3,179,147
Patented Apr. 20, 1965

3,179,147
TRACTION-AUGMENTING STUD FOR A
VEHICLE TIRE
Kurt Gerhard Edsmar, Stuvsta, Sweden, assignor to
Sandvikens Jernverks Aktiebolag, Sandviken, Sweden,
a corporation of Sweden
Filed Mar. 2, 1964, Ser. No. 348,408
Claims priority, application Sweden, Mar. 19, 1963,
2,955/63; Dec. 9, 1963, 13,617/63
5 Claims. (Cl. 152—210)

The present invention relates to traction-augmenting and skid-preventing studs for vehicle tires and the like, more particularly to studs consisting of (1) a fastening part for attaching and fastening the stud in the tire, said fastening part being made of steel or some other easily workable material, and (2) a tubular wear part of sintered carbide for cooperation with the road below the tire.

Tire studs with wear parts of sintered carbide for fastening in vehicle tires heretofore have been proposed. In the previously known studs the wear part of sintered material has, as a rule, been shaped as a relatively thin pin or peg which relatively small wear part has been fastened in a fastening part of metal, plastic material or the like. The fastening part as a rule has had a cylindrical shape and has been provided with an anchoring head opposite to the wear part.

These known studs have implied an improvement with regard to the anti-skid protection, but in certain relations they have been found less satisfactory for the purpose. The pin shaped wear part of sintered carbide, by reason of its small wear surface and small cross-section, rapidly wore out; moreover, it did not provide the desired good grip on the road surface. Additional disadvantages have been that after use for some time the studs often have been torn out from the bores in the tire in which they have been fastened; also that the studs because of their shape and of the load during use have not been able to maintain their position perpendicularly to the wear surface of the tire; the studs have been bent laterally, thereby allowing sand to enter between the stud and the rubber to cause wear finally resulting in the removal of the stud.

By the present invention the above mentioned, and other, disadvantages have been entirely eliminated, and a stud with superior qualities has been obtained. The invention is characterized in that the fastening part of the stud is formed with three portions having larger diameters than that of the intermediate portions, viz., an anchoring head at the inner end of the stud, a central flange and an outer end portion to which the tubular wear part is secured, the fastening part comprising an axial bore in which the tubular wear part is inserted and fastened by brazing. The head has a larger diameter than that of the central flange and of the outer end portion in which the tubular wear part is inserted. The tubular wear part preferably has a cylindrical outer surface and the recess a corresponding shape.

The invention will now be described in greater detail in the following specification taken with the appended drawing in which.

Figure 1:
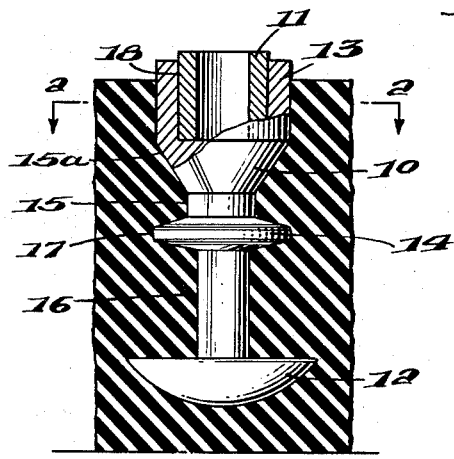
FIG. 1 is a side elevational view of the stud, partly in section.

The fastening part 10 shown in FIG. 1 is made of steel or other relatively easily workable material, for instance, bronze or other metal (or alloy), or certain plastics. The wear part 11 is tubular and is made of sintered carbide or a similar wear-resistant material. For this purpose there preferably is used a sintered alloy containing one or more metal carbides, for instance carbide of tungsten and/or other similarly hard materials together with one or more bonding metals such as cobalt and/or other metal selected from the iron group of elements of the periodic system.

The stud is fastened in the tire perpendicularly or substantially perpendicularly to the wear surface of the tire, and as a rule the fastening done by pressing the stud into a bore made in advance in the tire and having a diameter which preferably is smaller than or only equal to that of the smallest diameter of the stud e.g. the diameter of the "shank" portions. Sometimes certain parts of the bore, e.g. the part intended for the head 12 of the stud, can be made with a slightly greater diameter.

The fastening part 10 of the stud has three portions whose diameters are greater than that of the intermediate portions of the fastening part. These three portions are: The anchoring head 12, the outer end portion 13 embracing the wear part 11, and a flange 14 situated on the stud intermediate said anchoring head and said wear part. The head 12, which can have a rounded shape, should (as earlier mentioned) have a larger diameter than that of the portions 13 and 14. Between the said three portions with large diameters there are two portions 15 and 16 with a smaller diameter. These latter portions are as a rule cylindrical or at least conical. As appears from FIG. 1 the portion 15 between the wider portions 13 and 14 can be at least partly conical, the preferably cylindrical portion 13 connecting to a suitably conical part 15a in the directoin towards the flange 14. The intermediately situated flange 14 should have a rounded or blunt (obtuse) outer edge 17.

The portion 13 carrying the wear-resistant sintered carbide part 11 has a recess which as a rule is cylindrical and in which the wear part 11 is secured by brazing or a similar securing means. The outer shape of the wear part 11 should correspond to that of the recess 18, and the fastening of the wear part is suitably performed by a braze joint between the outside of the tubular wear part 11 and the inside of the recess 18. Suitably, the lower edge of the wear part also is brazed to the bottom of the recess. The tubular wear part 11 should as a rule protrude somewhat from the recess 18. By the said brazing of the wear part 11 there is effected a suitable distribution of the stresses caused by the large difference in coefficients of expansion of the sintered carbide and of the fastening part, which latter as a rule is made of steel, said distribution of stresses increasing the resistance of the wear part against the load to which it is subjected.

Figures 3A, 3B:
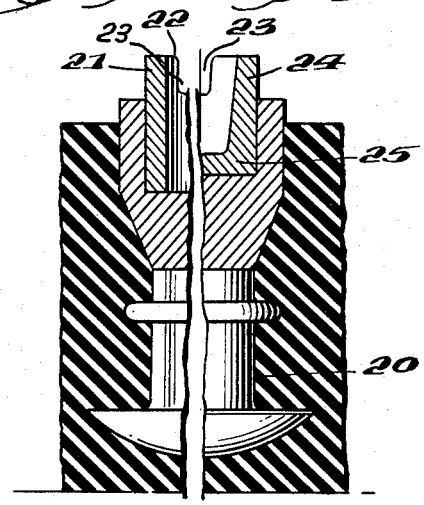
FIGS. 3a and 3b show, in enlarged scale, two further embodiments of the wear portion.
Figure 2:
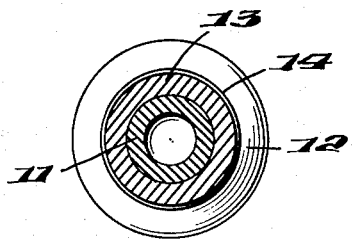
FIG. 2 shows a cross-section of the stud on the line 2—2 of FIG. 1.
Figure 4:
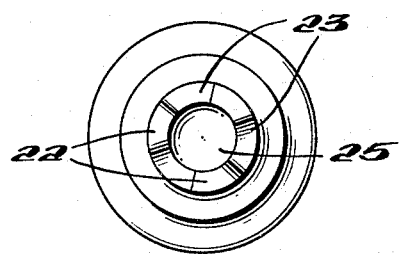
FIG. 4 is a top elevational view of the stud shown in FIG. 3.

In FIGS. 3a and 3b there are shown modified studs 20, in which the tubular member has lugs 22 at its front end. The lugs are separated by gaps 23 in the end portion of the tubular member. FIG. 3a illustrates a straight cylindrical tubular member 21, while FIG. 3b illustrates a modified tubular member 24 having an inwardly flanged bottom portion 25. FIG. 4 shows the stud from above with the lugs 22 and the spaces 23 between them. The number of lugs can be three as shown in the figure or it can be greater than three and possibly there can be only two. By the aid of the lugs the gripping ability of the stud becomes better, so that a smaller number of studs have to be inserted in order to improve the traction effect of the tire.

The stud according to the invention has a great stability against lateral forces acting thereupon, and thereby fulfills the desired requirement of protecting against skidding on icy roads and otherwise providing an improvement of the traction ability wherever this is found desirable. Studs of the present kind can for instance be used in airplane tires for preventing slippage between the tire and the ground, and the invention can be useful also in other connections where skidding or slippage should be prevented.

I claim:

1. Traction-augmenting and skid-preventing stud for vehicle tires and the like comprising a fastening part of relatively easily workable metal or alloy such as steel for fastening the stud in the tire and a tubular wear member attached to the fastening part and made of wear-resistant hard material such as sintered metal carbide adapted to cooperate with the road surface below the tire, characterized in that the fastening part consists of three portions having greater diameters than that of the portions therebetween, viz., an anchoring head at the inner end of the stud, an outer end portion having an axial bore in which the tubular member is positioned, a brazed joint holding the tubular member and the fastening member together, and an outstanding flange on the stud intermediate said head and said outer end portion the fastening part including anchoring head and intermediate flange being in one piece.

2. Stud according to claim 1, characterized in that the diameter of the head is larger than the diameters of the intermediate flange and of the outer end portion.

3. Stud according to claim 1, characterized in that the wear member has a cylindrical outer surface and the recess has a corresponding shape.

4. Stud according to claim 1, characterized in that the outer end of the wear member comprises a number of lugs.

5. Stud according to claim 4 characterized in that the lugs are integral with the tubular member and form continuations of the wall thereof, the lugs being separated by recesses in said wall.

References Cited by the Examiner

UNITED STATES PATENTS

| | | | |
|---|---|---|---|
| 1,017,732 | 2/12 | Blaisdell | 152—210 |
| 2,460,003 | 1/49 | Gemeny | 152—210 |
| 2,652,876 | 9/53 | Eisner | 152—210 |
| 3,124,191 | 3/64 | Forslund | 152—210 |
| 3,125,147 | 3/64 | Hakka | 152—210 |

ARTHUR L. LA POINT, *Primary Examiner.*